May 9, 1950     A. THARRATT     2,506,976
MEANS FOR MOUNTING ROCKETS ON AIRCRAFT
Filed Feb. 16, 1946     3 Sheets-Sheet 1
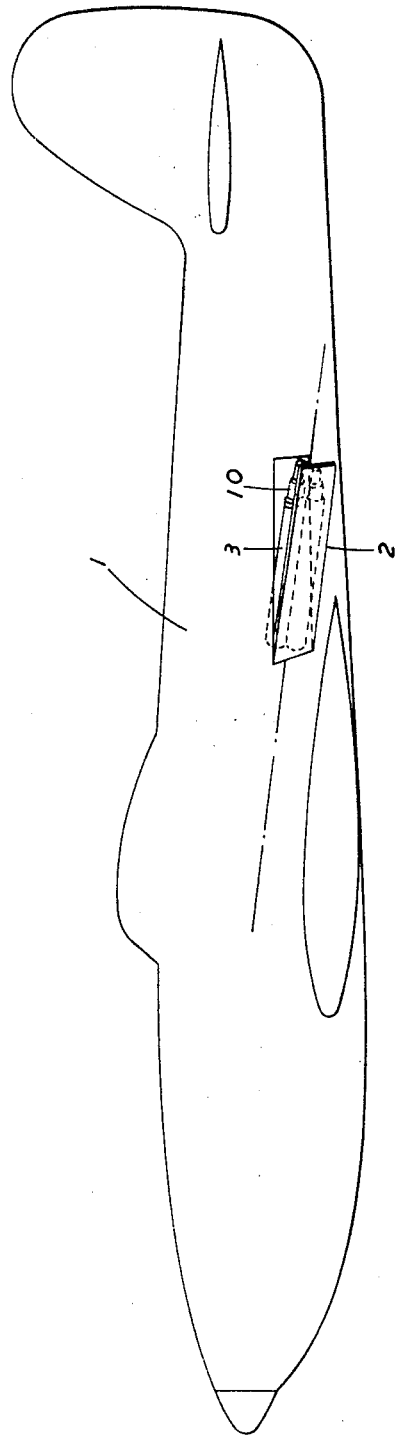
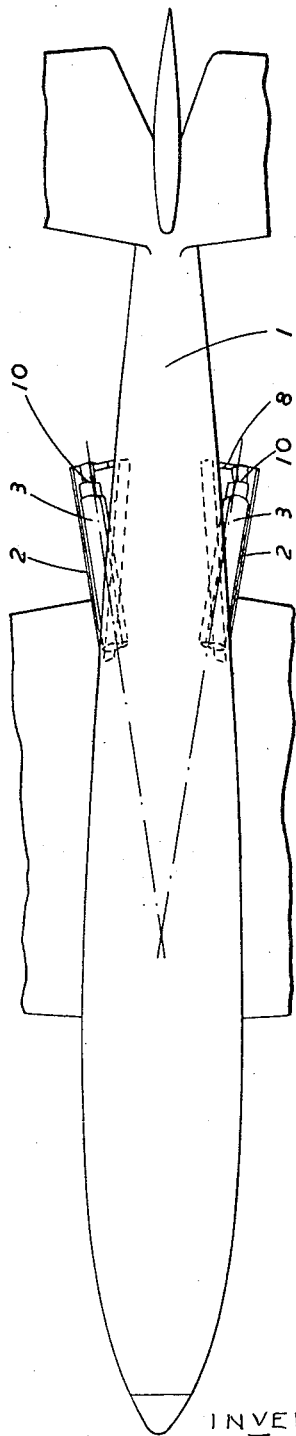
FIG. 1.
FIG. 2.
INVENTOR
Alexander Tharratt
By
his ATT'Y.

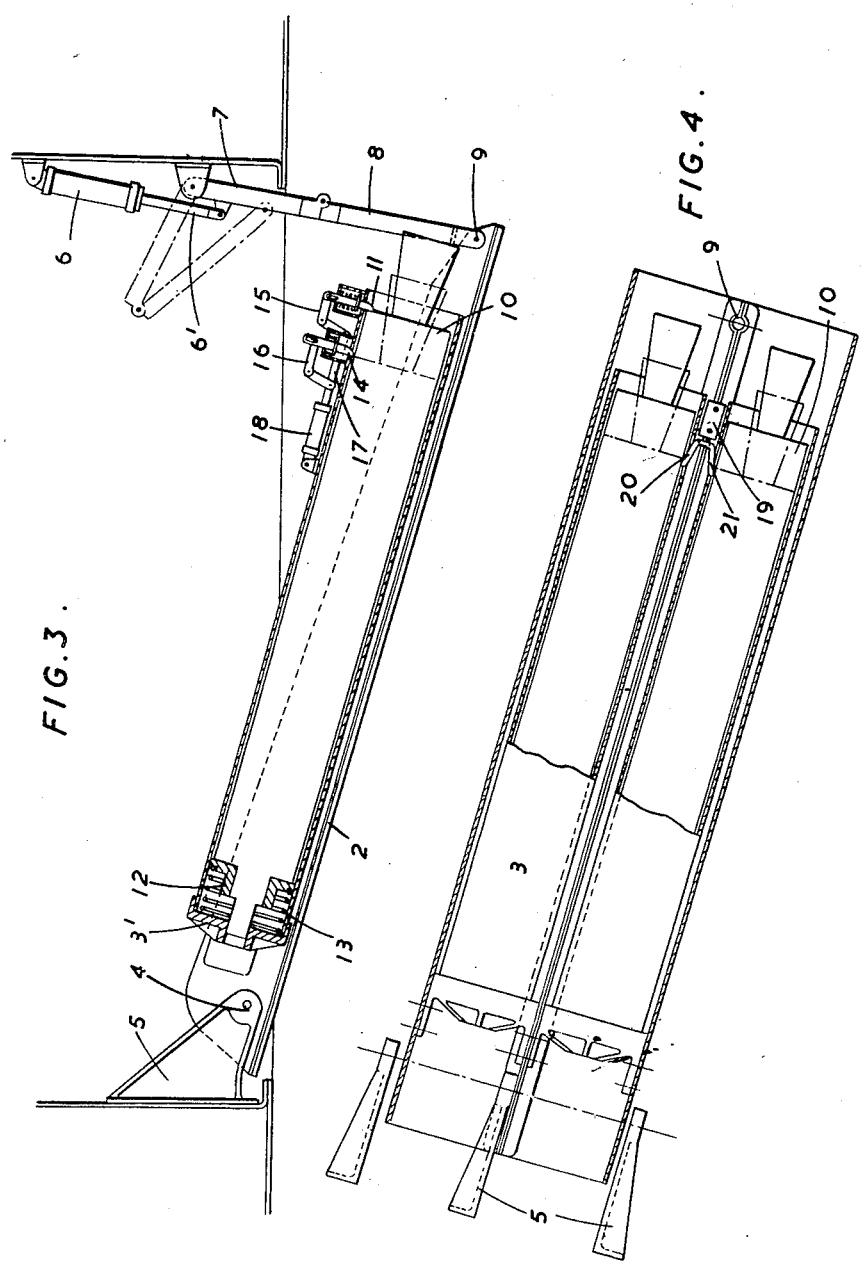

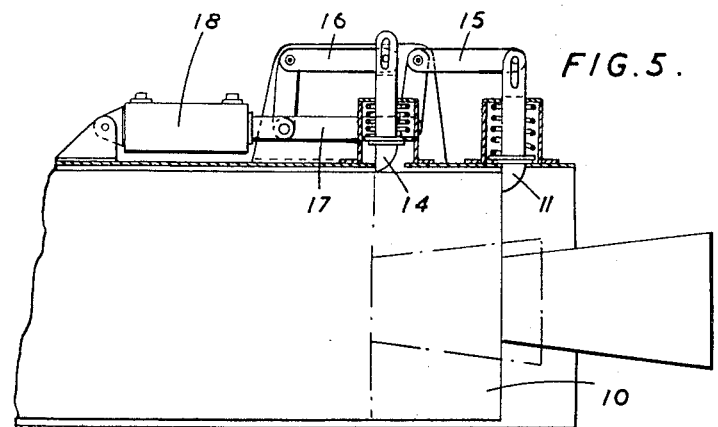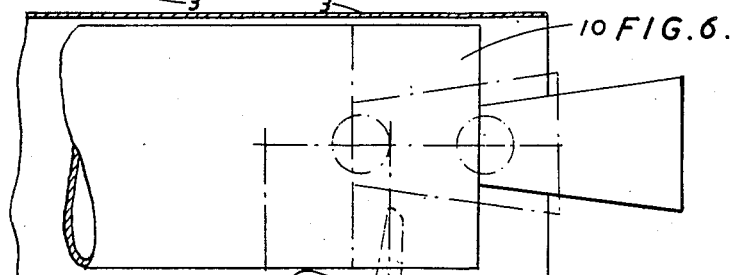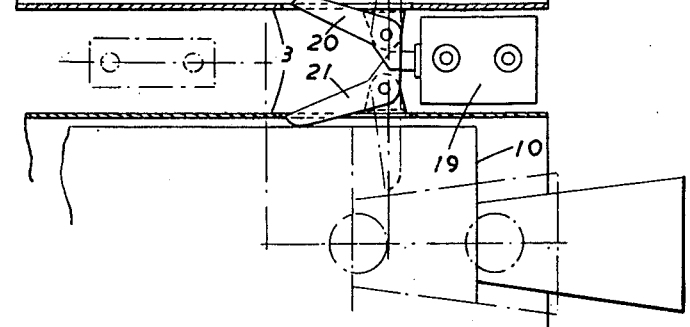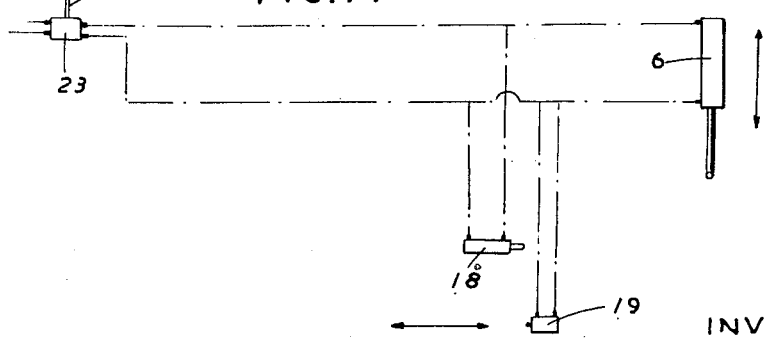

Patented May 9, 1950

2,506,976

UNITED STATES PATENT OFFICE 2,506,976

MEANS FOR MOUNTING ROCKETS ON AIRCRAFT

Alexander Tharratt, Hessle, England, assignor to Blackburn and General Aircraft Limited Application February 16, 1946, Serial No. 648,067
In Great Britain March 2, 1945

10 Claims. (Cl. 244—74)

This invention relates to improvements in aircraft and is particularly concerned with assisted take-off of both motor and jet-propelled aircraft.

Rockets are the usual medium for assisted take-off of which a plurality are mounted externally of the fuselage or on the wings in jettisonable mountings, but with such arrangements the rocket disposition is not entirely favourable and even after jettisoning the rocket casings and mountings to remove their weight, there may be some attachment points and suchlike projecting into the air stream, whilst a further disadvantage is the difficulty and time taken in positioning the rockets, their casings and mounting.

Now the object of the present invention is to provide a novel method of and means for mounting rockets on aircraft for purposes of assisted take-off which is aerodynamically sound, easy to load and provides many contingent advantages which will be appreciated from the following description.

According to the present invention, on each side of an aircraft fuselage and rearwardly of the centre of gravity of the aircraft there is provided a hinged panel on the inner surface of which a plurality of rockets may be mounted whilst its outer surface matches the contour of the fuselage, and the arrangement is such that when the panels are swung open the rockets are positioned appropriately for firing with their axes directed to pass through or near the centre of gravity of the aircraft.

In order that the invention may be clearly understood and readily carried into effect, one convenient embodiment thereof is hereinafter more fully described with reference to the accompanying drawings, which are given for purposes of illustration only and not of limitation.

In these drawings:

Figure 1 is a side elevation of an aeroplane showing the rocket carrying panel open;

Figure 2 is a plan view looking down on the aeroplane showing the symmetrical arrangement of the two rocket panels on each side of the fuselage, the panels being shown open;

Figure 3 is an edge on view of a rocket carrying panel with the rocket holding casings shown in section;

Figure 4 is a plan view looking down on a rocket carrying panel with the rocket holding casings shown partly in section;

Figure 5 is a detail view on an enlarged scale showing the rocket latching mechanism;

Figure 6 is another detail view also on an enlarged scale showing the automatic control of the interlocking valve in the hydraulic circuit of the panel retraction means, and Figure 7 shows a circuit diagram of the hydraulic system controlling the operation of the rocket carrying panels and the rocket ejection means.

Referring now to the said drawings and in particular to Figures 1 and 2 thereof, an aircraft 1 of any desired type, powered either by an internal combustion engine or by a jet-propulsion engine, has at each side of its fuselage a hinged panel 2 which externally conforms to the shape of the fuselage when in normal or closed position. Internally each panel 2 is provided with one, two or more cylinders 3, each intended to receive a complete rocket. Each panel 2 is hinged forwardly at 4 to convenient brackets 5 carried internally on the aircraft structure, and the movement of the panel from its retracted flush position into its extended position is controlled by a hydraulic jack 6, the ram $6^1$ of which is connected to one limb 7 of a toggle linkage, the other member 8 of which is pivoted at 9 near the free end of the panel 2. The hydraulic jacks 6 of the two panels are simultaneously supplied with fluid and hence the two panels are opened (and also closed) together simultaneously. The arrangement of the toggle links 7, 8 is such that when extended the centre pivot passes over centre and resists any tendency for the linkage to collapse until it is retracted under control of the hydraulic jack 6. When extended the panels 2 hold the rockets there-on with their axes passing through, or converging on, the centre of gravity of the aircraft as indicated by the broken lines in Figures 1 and 2. In this way, the thrust of the rockets is applied in the most favoured direction.

A rocket 10 is positioned in its cylinder 3 simply by being introduced therein and retained by a spring loaded catch 11 (see also Figure 5). At the closed end of the cylinder 3 is a piston like member 12 against which the rocket butts and between this member 12 and the end $3^1$ of the cylinder is a very strong compression spring 13. The arrangement is such that the introduction of a rocket 10 into its cylinder slightly compresses the spring 13 and forces the rocket casing against the catch 11. A further catch 14 is provided at a point somewhat nearer to the closed end and the arrangement is such that the thrust of the rocket 10, whilst being fired, forces the rocket along in its cylinder 3 so compressing the spring 13 and allowing the catch 14 to become operative. The latches 11, 14 are each connected through bellcrank levers 15, 16 respectively with the ram 17 of a hydraulic jack 18, and this arrangement is such that whilst the catches may move freely into engagement, the extension of the jack 18 withdraws both catches. On the withdrawal of the catches the energy stored in the spring 13 ejects the rocket from its cylinder 3.

In order to prevent closing of the panels before the spent rockets have been ejected a hydraulic interlocking valve 19 is provided in the hydraulic circuit to the jack 6. This interlocking valve 19 (see Figure 6) has its plunger located in the path of the limbs of bellcrank levers 20, 21 which levers extend through the walls of the cylinders 3. When a rocket is introduced into its cylinder it rocks a bellcrank lever and causes it to actuate the interlocking valve in such manner as to prevent hydraulic fluid flowing therethrough in a direction to retract the jack 6. When the spent rockets have been ejected, the interlocking valve permits fluid to reach the jack 6 for retraction purposes. As shown in Figure 7, the jacks 18 and 6 are in a common hydraulic circuit with the latter controlled by the interlocking valve 19. In this way the pilot or other operator merely operates the lever 22 of the controlling valve 23 to actuate the jack 18, whereafter on ejection of the spent rockets the fluid pressure will be applied to the jack 6 and the rocket carrying panels automatically retracted.

The form of rocket has not been described in detail since it is intended to use standard rockets of the kind provided for assisted take-off, nor have the drawings been complicated by illustrating electrical firing means such as are customarily provided for firing the rockets. If desired, only one of each pair of rockets may be fired when a separate controlling valve may be provided for closing the panels by means of the jack 6 or means may be provided for cutting out the interlock valve 19. The unused rockets may be retained for emergency use as for example to provide additional forward thrust as when an aircraft is baulked on attempting a deck landing at sea.

It will be understood that the hinged panels in open position may also serve to some extent as air brakes and when additional resistance is required the panels may be brought to open position so to act. If the panels are still carrying unfired rockets such rockets are then automatically positioned ready for emergency use without any time delay should the aircraft be baulked in attempted landing. The hinge line of the respective panels 2 is obliquely inclined but the precise inclination thereof and the disposition of the axes of the rockets and also the precise construction and shape of the panels may vary, having regard to the design and shape of the aircraft fuselage without in any way departing from the invention.

An aircraft provided with the rocket carrying hinged panels, in accordance with the invention, may have any or all of the following features— aerodynamically clean design with the panels closed, improved flying properties due to the additional braking effort of the panels in open position, rockets loaded and stowed out of reach of water or averse weather conditions whilst the aircraft is awaiting take-off, rockets automatically conditioned for use at initial take-off and also for baulked landing, absence of unnecessary weight and external projections, and quick easy loading facilities as it will be readily understood that rockets may be introduced into their cylinders much more quickly than external rocket carrying gear can be mounted on a fuselage and there is absence of waste such as occurs with jettisoned rocket holding gear.

I claim:

1. An aircraft including a pair of hinged panels one in each side of its fuselage and rearwardly of the centre of gravity of the aircraft, means on the inside of said panels each capable of receiving at least one rocket, latch means on said receiving means for retaining a rocket therein, spring means in said receiving means to eject a spent rocket from the receiving means, and hydraulic means connected to said panels for simultaneously swinging said panels into and out of operative position, and means preventing said panels from moving out of operative position until the spent rockets have been ejected.

2. An aircraft including a panel in each side of its fuselage at points rearwardly of the centre of gravity of the aircraft, at least one rocket receiving tube on the inside of said panel, spring loaded latching means in said tube for retaining a rocket therein, spring means in said tube for ejecting a rocket therefrom, hydraulic means connected to said latching means to retract said means to permit said spring means to eject said rocket, hydraulic actuating means connected to said panels for swinging them simultaneously into and out of operative position, and means including a hydraulic valve in said hydraulic actuating means for preventing swinging of said panels out of operative position until said hydraulic means have retracted said latching means and said rocket has been ejected.

3. An aircraft including a panel matching the contour of and hinged in an aperture in each side of its fuselage, at least one open ended tube on the inside of said panel, spring loaded latching means on said tube for retaining a rocket therein, spring means in said tube for ejecting a rocket therefrom, a second spring loaded latch on said tube to engage to retain said rocket on compression of said spring, hydraulic means connected to both of said latches for retracting the same to permit said spring to eject said rocket, hydraulic means including a toggle linkage connected to said panel for swinging said panels simultaneously into and out of operative position, and means including a hydraulic valve in said hydraulic actuating means for preventing swinging of said panel out of operative position until said hydraulic means have retracted said latching means and said rocket has been ejected by said spring.

4. An aircraft including a hinged panel in each side of its fuselage at a point rearwardly of the centre of gravity of the aircraft, means on the inside of said panel for retaining at least one rocket, and means connected to said panel to rock it from its normal position flush with the fuselage into open position, the axis of the rocket passing through the centre of gravity of the aircraft when the panels are fully open.

5. An aircraft including a pair of hinged panels which conform exteriorly with the contour of the part in which they are situated at points rearwardly of the centre of gravity of the aicrcraft, means on the inside of said panel for receiving at least one rocket, means in said receiving means for ejecting the casing of the rocket after it has been fired, and means connected to both of said panels for simultaneously rocking them into open position, the axis of the rocket passing through the centre of gravity of the aircraft when the panels are fully open.

6. An aircraft including a pair of hinged panels one in each side of its fuselage and rearwardly of the centre of gravity of the aircraft, means mounted on the inside of said panels each capable of receiving at least one rocket, latch means on said receiving means for retaining a rocket therein, means in said receiving means to eject a rocket from the retaining means, and hydraulic means connected to said panels for swinging said panels into and out of operative position, the axis of the rocket passing through the centre of gravity of the aircraft when the panels are in fully open operative position.

7. An aircraft including a pair of hinged panels one in each side of its fuselage and rearwardly of the centre of gravity of the aircraft, means mounted on the inside of said panels each capable of receiving at least one rocket, latch means on said receiving means for retaining a rocket therein, spring means in said receiving means to eject a spent rocket from the receiving means, and hydraulic means connected to said panels for simultaneously swinging said panels into and out of operative position, the axis of the rocket passing through the centre of gravity of the aircraft when the panels are in fully open operative position.

8. An aircraft including a panel in each side of its fuselage at points rearwardly of the centre of gravity of the aircraft, at least one rocket receiving tube mounted on the inside of said panel, spring loaded latching means on said tube for retaining a rocket therein, spring means in said tube for ejecting a rocket therefrom, hydraulic means connected to said latching means for retracting the same to permit said spring means to eject said rocket from said tube, and hydraulic actuating means connected to said panels for swinging them into and out of operative position, the axis of the rocket passing through the centre of gravity of the aircraft when the panels are in fully open operative position.

9. An aircraft including a panel matching the contour of and hinged in an aperture in each side of its fuselage, at least one open ended tube mounted on the inside of said panel, spring loaded latching means on said tube for retaining a rocket therein, spring means in said tube for ejecting a rocket therefrom, a second spring loaded latch on said tube to engage to retain said rocket on compression of said spring, hydraulic means connected to both of said latches for retracting them to permit said spring to eject said rocket from said tube, hydraulic means including a toggle linkage connected to said panels for swinging them simultaneously into and out of operative position, the axis of the rocket passing through the centre of gravity of the aircraft when the panels are in fully open operative position.

10. An aircraft including a panel in each side of its fuselage at points rearwardly of the centre of gravity of the aircraft, at least one rocket receiving tube mounted on the inside of said panel, spring loaded latching means on said tube for retaining a rocket therein, spring means in said tube for ejecting a rocket therefrom, hydraulic means connected to said latching means for retracting the same to permit said spring means to eject said rocket from said tube, hydraulic actuating means connected to said panels for swinging them into and out of operative position, the axis of the rocket passing through the centre of gravity of the aircraft when the panels are in fully open operative position and means including a hydraulic valve in said hydraulic actuating means for preventing swinging of said panels out of operative position until said hydraulic means have retracted said latching means and said rocket has been ejected.

ALEXANDER THARRATT.

REFERENCES CITED

The following references are of record in the file of this patent:

UNITED STATES PATENTS

| Number | Name | Date |
|---|---|---|
| 1,389,757 | Haynes | Sept. 6, 1921 |
| 1,611,353 | Lepinte | Dec. 21, 1926 |
| 2,325,630 | Petty | Aug. 3, 1943 |
| 2,356,674 | Kimmel | Aug. 22, 1944 |
| 2,422,744 | O'Neil | June 24, 1947 |

FOREIGN PATENTS

| Number | Country | Date |
|---|---|---|
| 322,641 | Germany | July 5, 1920 |